United States Patent
Jackson

(10) Patent No.: US 11,707,155 B2
(45) Date of Patent: Jul. 25, 2023

(54) MEANS FOR STIRRING CONTENTS OF A POT THROUGH A COVERED LID

(71) Applicant: Domonique Simone Jackson, Matteson, IL (US)

(72) Inventor: Domonique Simone Jackson, Matteson, IL (US)

( * ) Notice: Subject to any disclaimer, the term of this patent is extended or adjusted under 35 U.S.C. 154(b) by 176 days.

(21) Appl. No.: 17/248,037

(22) Filed: Jan. 6, 2021

(65) Prior Publication Data

US 2022/0211209 A1    Jul. 7, 2022

(51) Int. Cl.
*A47J 36/16* (2006.01)
*A47J 36/06* (2006.01)

(52) U.S. Cl.
CPC .............. *A47J 36/165* (2013.01); *A47J 36/06* (2013.01)

(58) Field of Classification Search
CPC ........ A47J 36/06; A47J 36/165; A47J 37/101; A47J 37/108; B65D 51/32
See application file for complete search history.

(56) References Cited

U.S. PATENT DOCUMENTS

| | | |
|---|---|---|
| 1,617,643 A | 2/1927 | Kriete |
| 2,559,196 A | 7/1951 | Medved |
| 3,141,568 A | 7/1964 | Chuanico |
| 3,648,320 A * | 3/1972 | Woolley ................. A47L 23/24 15/187 |
| 3,783,770 A | 1/1974 | Aries |
| 5,372,422 A | 12/1994 | Dubroy |
| 5,738,228 A * | 4/1998 | Bittinger ............... A47F 7/0021 211/60.1 |
| 5,765,947 A | 6/1998 | Dubroy |
| 5,881,633 A | 3/1999 | Adams |
| 6,237,470 B1 | 5/2001 | Adams |
| 7,677,792 B2 | 3/2010 | Saunders et al. |
| 9,635,975 B2 | 5/2017 | Walker |
| 9,756,982 B2 | 9/2017 | Cloutier et al. |
| 10,214,327 B1 * | 2/2019 | Bearden ............... B65D 43/161 |
| 2012/0174800 A1 | 7/2012 | Montavy et al. |
| 2012/0189745 A1 | 7/2012 | DeLong |
| 2015/0033951 A1 | 2/2015 | Randall et al. |

(Continued)

FOREIGN PATENT DOCUMENTS

| | | | |
|---|---|---|---|
| CN | 103284616 A * | 9/2013 | |
| GB | 2245816 A * | 1/1992 | ............. A47J 36/06 |

(Continued)

*Primary Examiner* — John J Norton

(74) *Attorney, Agent, or Firm* — Dunlap Bennett & Ludwig, PLLC

(57) ABSTRACT

A stir-through lid providing a tortuous opening extending from or near the center of the stir-through lid circuitously extending until just inward of the periphery of the stir-through lid. The tortuous opening is substantially filled with bristles extending from both edges of the tortuous opening so that the distal ends of the bristles abut and/or interlock. The bristles are flexible, resilient, and biased in a radial, un-urged position so that when a utensil is introduced through the bristles, the bristles are self-minimizing as they biasedly engage the introduced utensil. Finally, the tortuous opening is dimensioned and adapted to enable the introduced utensil to reach the entirety of the bottom of the cookware the lid operatively associates with, including the corners thereof.

10 Claims, 4 Drawing Sheets

(56) References Cited

U.S. PATENT DOCUMENTS

2016/0255994 A1* 9/2016 Walker .................... A47J 36/06
2020/0046109 A1* 2/2020 Pulfrey .................... A46B 9/06

FOREIGN PATENT DOCUMENTS

| KR | 2016004610 A | * | 1/2016 | | |
| KR | 2094602 B1 | * | 3/2020 | .............. | A47J 36/04 |
| WO | WO-2015049625 A1 | * | 4/2015 | ............ | A47J 37/101 |

* cited by examiner

MEANS FOR STIRRING CONTENTS OF A POT THROUGH A COVERED LID

BACKGROUND OF THE INVENTION

The present invention relates to cookware and, more particularly, a means for satisfactorily stirring contents of a pot through a covered lid.

While stirring hot food in an uncovered pot, the contents of the pot can bubble up and splatter causing physical harm to the person tending to the food as well as creating a mess on the stovetop and surrounding areas.

Relying on the manual use of a pot's lid as a shield against hot, splattering food still presents a problem because the user cannot simultaneously stir the contents satisfactorily and be shielded, as the user would need to raise the lid and insert and maneuver a stirring utensil. This necessary space, in turn, creates an opening for hot, splattering contents to get on the human's fingers, hand, wrist, arm, stovetop, articles of clothing, and any surrounding areas.

Other devices or systems in the field either require a user to at least lift a portion of the lid from the pot in order to stir its contents, or they do not appreciate that stirring is not as simple as moving a utensil randomly or haphazardly through just portion of the contents.

As for the requirement of detaching at least a portion of the lid, as mentioned above, current devices or systems do not work well because they allow contents of the pot to splatter beyond the pot while cooking.

Turning now to the importance of proper stirring, for those who care about the results of their cooking efforts, it is understood in the art of cooking that stirring is a purposefully act, with dos and don'ts. Competent stirring includes, but is not necessarily limited to, the following purposes: to create a homogenous mixture; to evenly disperse temperature; and to alter the viscosity of a liquid (thicker or thinner). As a result, ensuring that the stirring utensil can reach the entirety of the bottom including the corners is important for preventing uneven temperature increases of the food stuff (e.g., preventing burning a portion of the contents), especially when stirring high viscosity liquids (think: sauces) over heat.

As can be seen, there is a need for a means for satisfactorily stirring contents of a pot through a covered lid. The present invention obviates the need to remove the lid from the cooking pot to any degree in order to stir its hot, splattering contents, thus fully shielding the user and surrounding areas against the bubbling contents during the stirring process.

The stir-through lid embodied by the present invention may include a self-minimizing, bristled pathway the utensil can stir through.

SUMMARY OF THE INVENTION

In one aspect of the present invention, a stir-through lid including a tortuous opening extending circuitously from a central point at or near the center of the stir-through lid to a peripheral point just inward of a periphery of the stir-through lid, wherein the peripheral point is disposed a peripheral distance along the stir-through lid from said periphery thereof, and wherein the central point is disposed a central distance along the stir-through lid from said center, wherein the peripheral distance is equal to or less than one-fourth a radial distance between said periphery and said center, and wherein the central distance is equal to or less than one-fourth the radial distance; a plurality of bristles occupying the tortuous opening from the central point to the peripheral point, wherein the plurality of bristles comprises a first plurality cantilevered from one edge of the tortuous opening and a second plurality cantilevered from an opposing edge of the tortuous opening so that a distal end of first and second pluralities interlock and/or abut, wherein the plurality of bristles is flexible, resilient, and biased in an un-urged position in such a way as to be self-minimizing, and wherein the stir-through lid is transparent.

These and other features, aspects and advantages of the present invention will become better understood with reference to the following drawings, description and claims.

DETAILED DESCRIPTION OF THE INVENTION

Figure 1:
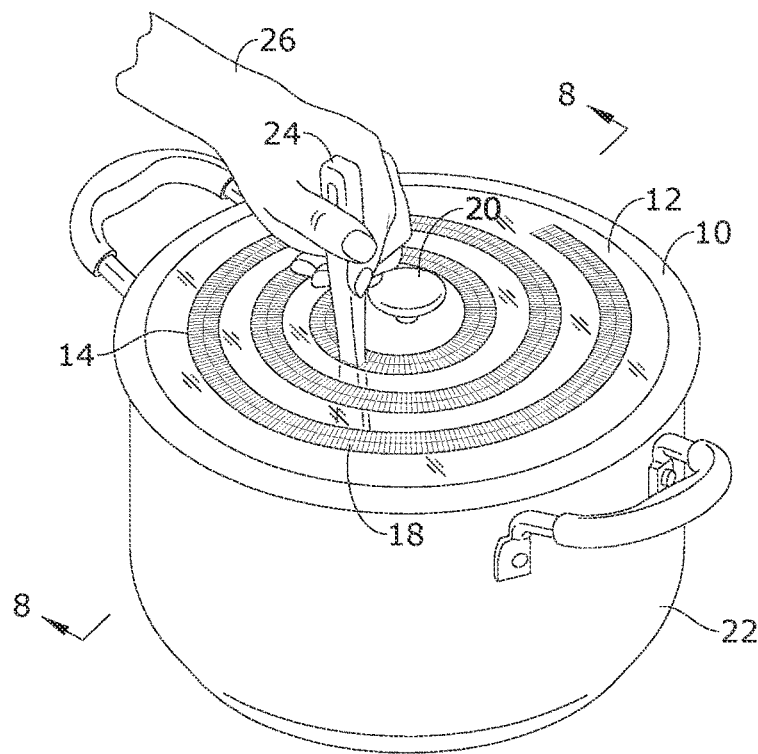
FIG. 1 is a perspective view of an exemplary embodiment of the present invention, shown in use.
Figure 2:
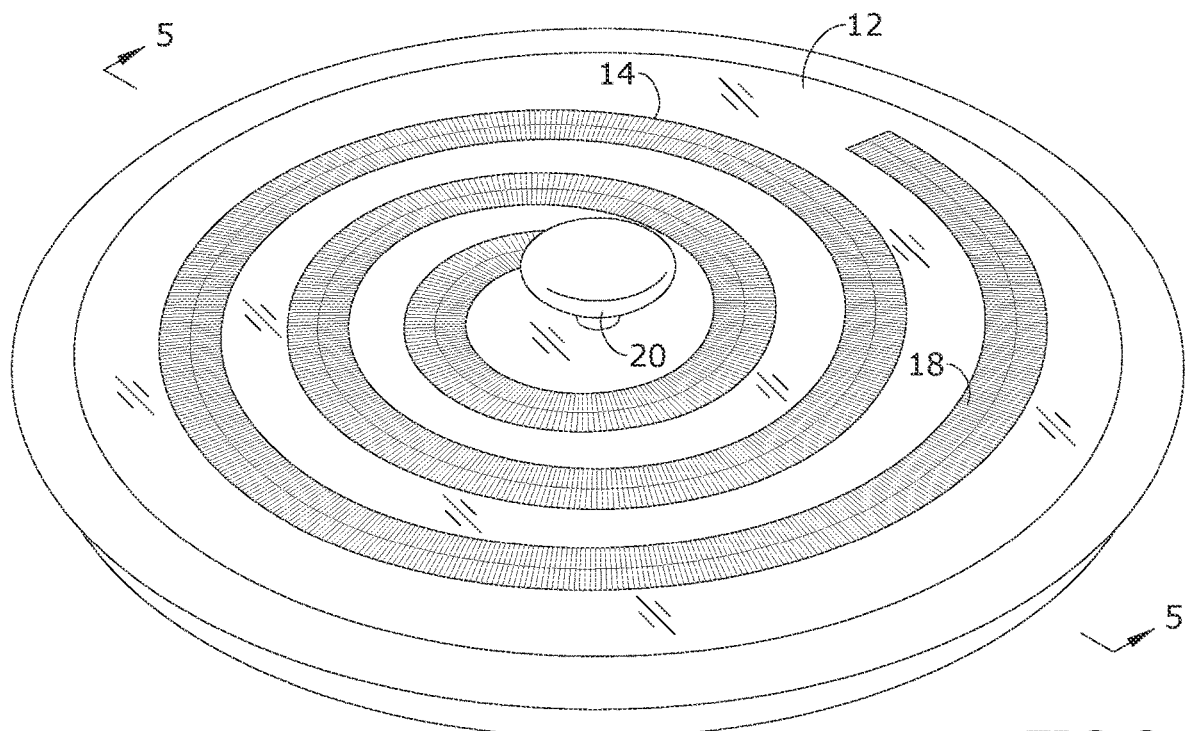
FIG. 2 is a perspective view of an exemplary embodiment of a stir-through lid of the present invention.
Figure 3:
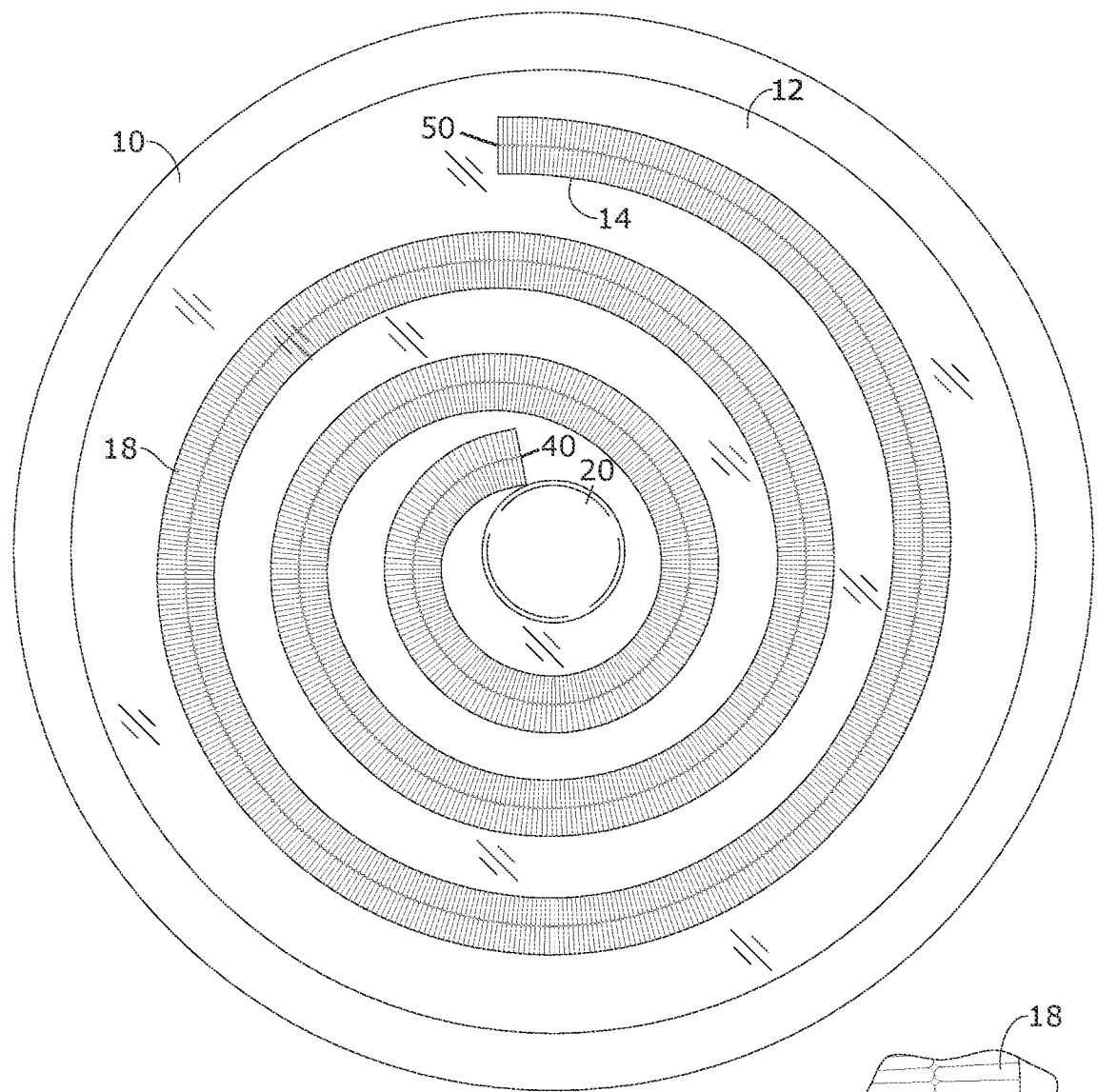
FIG. 3 is a top plan view of an exemplary embodiment of the stir-through lid of present invention.
Figure 4:
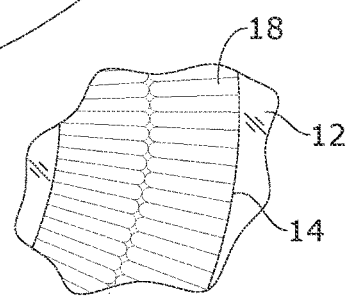
FIG. 4 is a detailed top plan view of an exemplary embodiment of a self-minimizing opening of the stir-through lid of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a stir-through lid providing a tortuous opening extending from or near the center of the stir-through lid circuitously until the tortuous opening ends just inward of the periphery of the stir-through lid. The tortuous opening is substantially filled with bristles extending from both edges of the tortuous opening so that the distal ends of the bristles abut and/or interlock. The bristles are flexible, resilient, and biased in a radial, un-urged position so that when a utensil is introduced through the bristles, the bristles are self-minimizing as they biasedly engage the introduced utensil. Finally, the tortuous opening enables the introduced utensil to reach the entirety of the cookware the lid operatively associates with, including the corners thereof.

Referring now to FIGS. 1 through 9, the present invention may include a stir-through lid 12 made of, preferably, transparent or translucent material (such as glass, tempered glass, plasticized material or other synthetic material), wherein the stir-through lid 12 has a peripheral rim 10 dimensioned and adapted to enclose an opening of an operatively associable cookware 22. The cookware 22 may be anything suitable for cooking or baking (including but not limited to a pot, saucepan, wok, and the like) having a cavity for contents, wherein the cavity communicates to said opening enclosed by the stir-through lid 12. The stir-through lid 12 may or may not have a handle 20, which may extend from the peripheral rim 10, be centrally disposed, or located anywhere along an exterior portion of the stir-through lid 12. The handle 20 may be a vented knob.

The stir-through lid 12 provides a tortuous opening 14 that communicates to said opening; in other words, the tortuous opening 14 is operative between an exterior and an interior of the stir-through lid 12. The tortuous opening 14 may define or be defined by a spiral or a curve which emanates from a central point 40, at or near the center of the stir-through lid 12, wherein the tortuous opening 14 moves farther away as it revolves around the central point 40. In certain embodiments, the curvature of the tortuous opening 14 is on a plane that winds around the central point 40 at a continuously increasing or decreasing distance from the central point 40. In other embodiments, the curvature of the tortuous opening 14 is three-dimensional and turns around an axis at a constant or continuously varying distance while moving parallel to the axis. The tortuous opening 14 terminates just inward from the outer perimeter/peripheral rim 10 at a peripheral point 50.

The distance between peripheral point 50 and the perimeter/peripheral rim 10 (herein, the "peripheral distance") may be equal to or less than one-third the 'radius' of the stir-through lid 12 (assuming the lid 12 is circular, which it may not be in certain embodiments)—i.e., the distance between the perimeter/peripheral rim 10 and the center of the stir-through lid 12. The distance between central point 40 and the center of the stir-through lid 12 (herein, the "central distance") may be equal to or less than one-third the 'radius' of the stir-through lid 12. By way of example, if the stir-through lid 12 were circular and had a radius of nine inches, the peripheral distance (between the peripheral point 50 and the perimeter/peripheral rim 10) would be three inches or less, while the central distance would be three inches or less. Yet in other embodiments, the central point 40 and the peripheral point 50 could be a shared point, as the tortuous opening 14 where a circular or oval shape.

Figure 5:
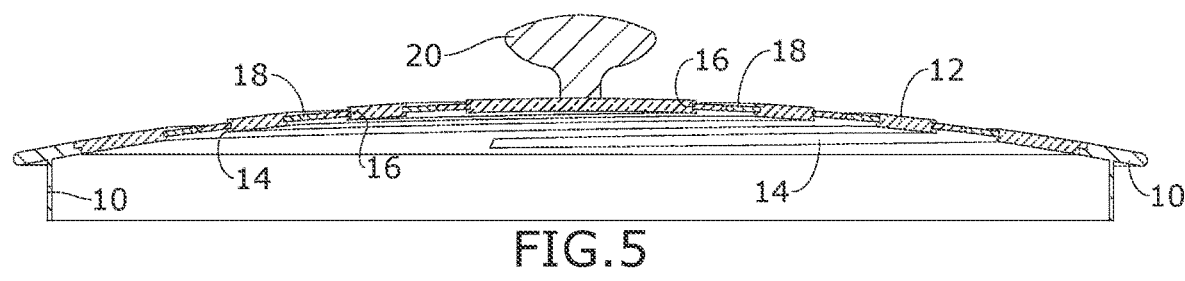
FIG. 5 is a section view of an exemplary embodiment of the stir-through lid of the present invention, taken along line 5-5 of FIG. 2.

The tortuous opening 14 may be similar to a strip filled with bristles 18 protruding from both sides of the tortuous opening 14, wherein the bristles 18 interlock and/or abut. Specifically, the bristles 18 may extend radially from each of the opposing edges of the tortuous opening 14 so that the distal ends of the bristles 18 interlock and/or abut tip to tip (as shown in FIG. 5) or the distal ends may be offset so as to nest in the spaced afforded by two opposing bristles 18. In short, the number, positioning, radial extent, width, orientation and shape of bristles 18 may vary from that illustrated.

Figure 6:
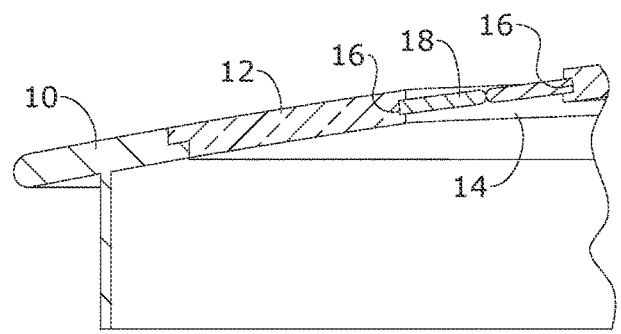
FIG. 6 is a detailed section view of FIG. 5.
Figure 7:
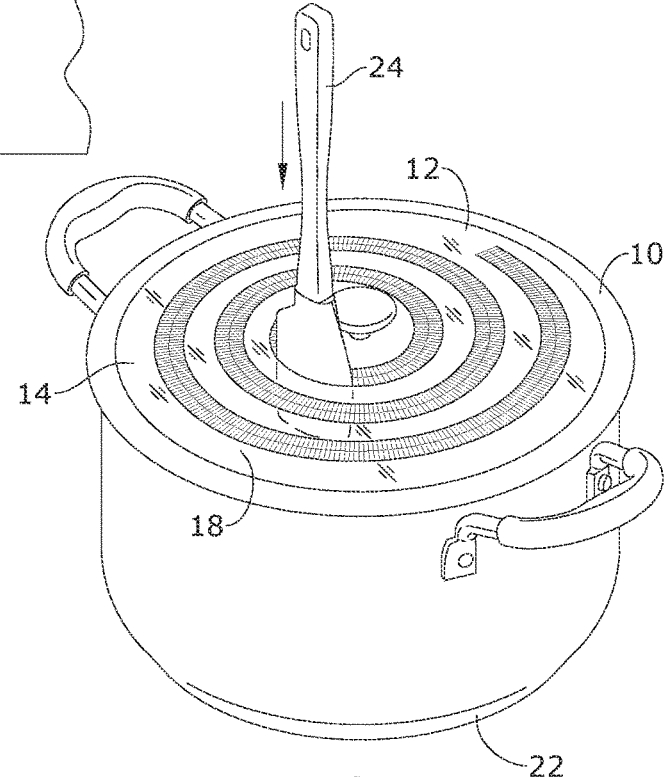
FIG. 7 is a perspective view of an exemplary embodiment of the present invention, shown in use illustrating insertion of a utensil through the self-minimizing opening.
Figure 8:
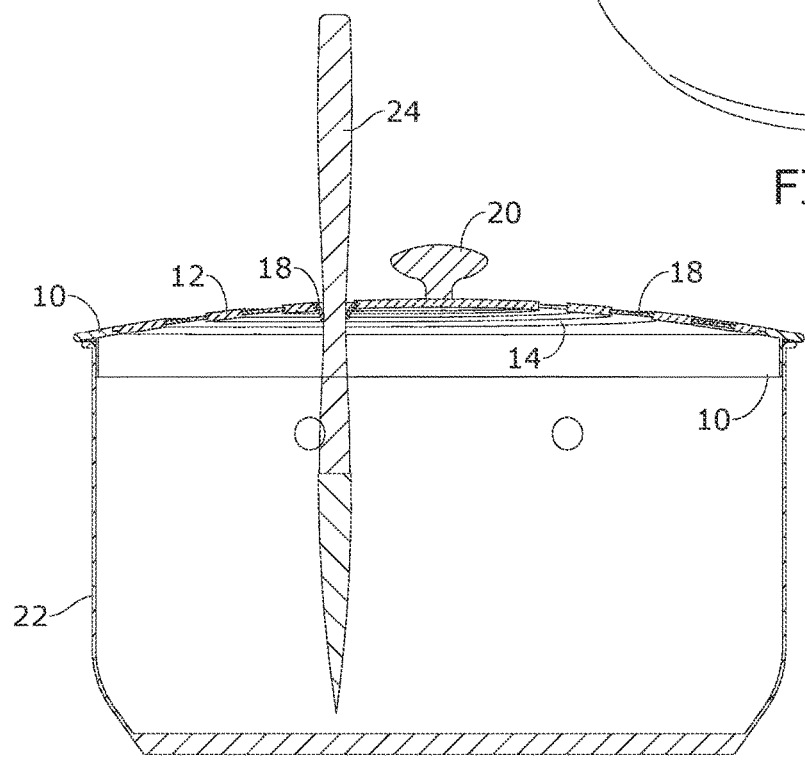
FIG. 8 is a section view of an exemplary embodiment of the present invention, taken along line 8-8 of FIG. 1.
Figure 9:
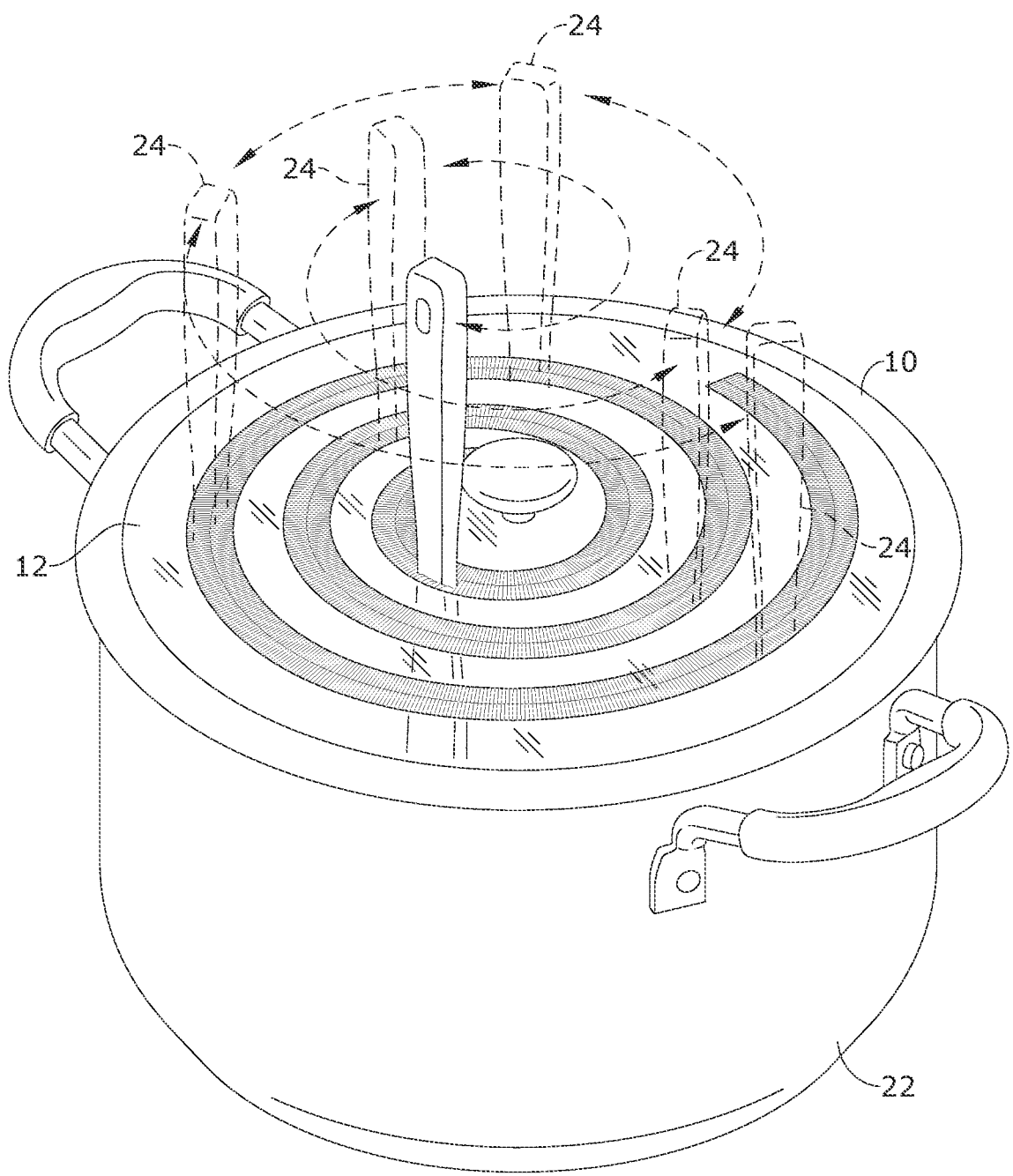
FIG. 9 is a perspective view of an exemplary embodiment of the present invention, shown in use illustrating sufficiently stirring through the stir-through lid of the present invention, whereby the stirring can purposefully reach the entirety of the bottom of the pot as well as the corners so that the contents of the pot can be evenly mixed, stirred, and/or heated.

The bristles 18 may be flexible, resilient, tapered protrusions, whereby the tortuous opening 14 is self-minimizing—i.e., the tortuous opening 14 resiliently allows for introduction of a cooking utensil 24 therethrough, as necessary, by urging the flexible bristles 18 to pivot or bend downward toward the cookware 22 (as illustrated in FIG. 8); though, the bristles 18 are elastically biased in the planar, un-urged, radial position (as illustrated in FIG. 6), thereby minimizing the size of the opening around the inserted portion of the utensil 24, when the utensil 24 is in use. Moreover, this bias enables the bristles 18 to hold the utensil 24 in place, as illustrated in FIG. 8.

The proximal ends of the bristles 18 may be connected to and/or in the opposing edges by way of slots 16 or other connection methodologies. In other embodiments, the tortuous opening 14 may be reconfigured in a variety of pathway design beyond the indicated spiral yet perform a similar function; the tortuous opening 14 could zig-zag or take the shape of a square, circle, or any other shaping.

A method of using the present invention may include the following. The stir-through lid 12 disclosed above may be provided. A user 26 can insert the stirring utensil 24 into the bristled tortuous opening 14 and guide it along the bristled pathway freely in any direction. The bristling 18 is interlocking, serving as teeth or guides that allow the user to leave the utensil in the pathing upright without falling over in any direction, yet users can easily pass the utensil 24 in and out of the bristled pathway.

To use the present invention, the user 26 would affix the stir-through lid 12 to the cookware 22, insert their applicable stirring utensil 24 into the bristled pathway of the tortuous opening 14, and guide it along the pathing in their desired direction: enabling the working end of the utensil 24 to reach and engage the entirety of the bottom of the cookware 22, including the corners.

Additionally, the present invention can also be used to cover other containers beyond cooking pots that have contents that need to be stirred, mixed, or agitated.

It should be understood, of course, that the foregoing relates to exemplary embodiments of the invention and that modifications may be made without departing from the spirit and scope of the invention as set forth in the following claims.

What is claimed is:
1. A stir-through lid, comprising:
a tortuous opening extending circuitously from a central point at or near the center of the stir-through lid to a peripheral point just inward of a periphery of the stir-through lid, wherein the tortuous opening defines a continuous spiral pathway that turns at least seven-hundred and twenty degrees about the center point;
a plurality of bristles occupying the tortuous opening from the central point to the peripheral point,
wherein each bristle of the plurality of bristles extends from a tip end to an edge end, wherein a body portion interconnects said ends, and wherein the plurality of bristles comprises:
a first plurality of bristles extending from a first edge of the tortuous opening; and
a second plurality of bristles extending from a second edge of the tortuous opening so that the tip ends of the first and second pluralities form an interlocking engagement,
wherein the cross section of the body portion is symmetrical across a vertical line and a horizontal line.
2. The stir-through lid of claim 1, wherein the peripheral point is disposed a peripheral distance along the stir-through lid from said periphery thereof, and wherein the central point is disposed a central distance along the stir-through lid from said center, wherein the peripheral distance is equal to or less than one-fourth a radial distance between said periphery and said center, and wherein the central distance is equal to or less than one-fourth the radial distance.
3. The stir-through lid of claim 1, wherein the plurality of bristles comprises a first plurality cantilevered from one edge of the tortuous opening and a second plurality canti- levered from an opposing edge of the tortuous opening so that a distal end of first and second pluralities abut.

4. The stir-through lid of claim 3, wherein the plurality of bristles is flexible, resilient, and biased in an un-urged position in such a way as to be self-minimizing.

5. The stir-through lid of claim 4, wherein the stir-through lid is transparent.

6. The stir-through lid of claim 1, wherein the interlocking engagement serves as teeth guiding a utensil along the bristled pathway.

7. The stir-through lid of claim 1, wherein the tip ends taper, thereby facilitating the interlocking engagement.

8. A stir-through lid comprising:
a tortuous opening extending circuitously from a central point at or near the center of the stir-through lid to a peripheral point just inward of a periphery of the stir-through lid, wherein the tortuous opening defines a continuous spiral pathway that turns at least seven-hundred and twenty degrees about the center point;
a plurality of bristles occupying the tortuous opening from the central point to the peripheral point,
wherein each bristle of the plurality of bristles extends from a tip end to an edge end, wherein a body portion interconnects said ends, and wherein the plurality of bristles comprises:
a first plurality of bristles extending from a first edge of the tortuous opening; and
a second plurality of bristles extending from a second edge of the tortuous opening so that the tip ends of the first and second pluralities form an interlocking engagement; and
a first slot and a second slot along the first and second edges, respectively, and wherein the edge ends of the first and second pluralities of bristles are received in the first and second slot, respectively.

9. The stir-through lid of claim 8, wherein the plurality of bristles is defined by a single layer of bristles.

10. A stir-through lid comprising:
a tortuous opening extending circuitously from a central point at or near the center of the stir-through lid to a peripheral point just inward of a periphery of the stir-through lid, wherein the tortuous opening defines a continuous spiral pathway that turns at least three-hundred and sixty degrees a bout the center point;
a plurality of bristles occupying the tortuous opening from the central point to the peripheral point,
wherein the plurality of bristles is flexible, resilient, and biased in an un-urged position in such a way as to be self-minimizing, wherein each bristle of the plurality of bristles extends from a tip end to an edge end, wherein a body portion interconnects said ends, and wherein the plurality of bristles comprises:
a first plurality of bristles extending from a first edge of the tortuous opening; and
a second plurality of bristles extending from a second edge of the tortuous opening so that the tip ends of the first and second pluralities form an interlocking engagement,
wherein the interlocking engagement serves as teeth guiding a utensil along the bristled pathway,
wherein the tip ends taper, thereby facilitating the interlocking engagement,
wherein the cross section of the body portion is symmetrical across a vertical line and a horizontal line; and
a first slot and a second slot along the first and second edges, respectively, and wherein the edge ends of the first and second pluralities of bristles are received in the first and second slot, respectively,
wherein the plurality of bristles is defined by a single layer of bristles.

* * * * *